Patented May 9, 1950

2,507,146

UNITED STATES PATENT OFFICE 2,507,146

METHOD OF MAKING A 3-HALO-2-METHYL-QUINOLINE

Joseph B. Dickey and Fred C. Duennebier, Rochester, N. Y., assignors to Eastman Kodak Company, Rochester, N. Y., a corporation of New Jersey No Drawing. Application March 12, 1946, Serial No. 653,944

7 Claims. (Cl. 260—283)

This invention relates to a new process for preparing 3-(bromo or chloro)-2-methylquinoline compounds and to certain of these compounds as new compounds.

It is an object of our invention to provide a new process for preparing 3-(bromo or chloro)-2-methylquinoline compounds. A further object is to provide new 3-(bromo or chloro)-2-methylquinoline compounds.

It is known to prepare 3-(bromo or chloro)-quinoline by diazotizing 3-aminoquinoline and treating the diazonium compound obtained with cuprous bromide and cuprous chloride, respectively. It is also known to prepare 3-chloroquinoline from 3-sulfoquinoline by replacing the sulfo group with a chlorine atom by direct chlorination or by treatment with hydrochloric acid and sodium chlorate. Further, it is known to prepare 3-chloroquinoline compounds by direct chlorination of quinoline compounds. This latter method has not proved satisfactory for the preparation of 3-chloro-2-methylquinoline compounds for the reason that when 2-methylquinoline is directly chlorinated, the chlorine shows a preference for the methyl group rather than the quinoline nucleus.

We have now discovered that 3-(bromo or chloro)-2-methylquinoline compounds can be prepared by reacting monocyclic aminobenzene compounds having an unsubstituted position ortho to the amino group with α-(bromo or chloro)-crotonaldehyde or α-(bromo or chloro)-β-hydroxy-n-butyraldehyde in the presence of a mineral acid and in the presence of an oxidizing agent. Mineral acids that can be employed include hydrochloric acid, hydrobromic acid, hydrofluoric acid, phosphoric acid and sulfuric acid. Oxidizing agents that can be employed include nitrobenzene, nitrobenzene sulfonic acids and arsenic acid (H₃AsO₄·½H₂O). So far as we are aware any monocyclic aminobenzene compound having an unsubstituted position ortho to the amino group can be used although some compounds work better than others.

Arsenic pentaoxide, As₂O₅, can be used in place of arsenic acid since when sufficient water is added to As₂O₅ arsenic acid (H₃AsO₄·½H₂O) is formed. It will be understood therefore that the term arsenic acid includes its anhydride form As₂O₅. As a matter of fact the use of As₂O₅ with water provides a very convenient way of adding arsenic acid to the reaction mixture.

α-Chloro crotonaldehyde is a known compound. It can be prepared by reacting chlorine with a water solution of crotonaldehyde to obtain α-chloro-β-hydroxy-n-butyraldehyde which is recovered by distillation under reduced pressure (1 to 10 mm., for example). Upon heating to a sufficient temperature α-chloro-β-hydroxy-n-butyraldehyde gives off water and forms α-chloro crotonaldehyde. Similarly α-bromo-β-hydroxy-n-butyraldehyde can be prepared by reacting bromine with a water solution of crotonaldehyde and α-bromo crotonaldehyde can be prepared therefrom by heating. The process described in German Patent 559,329 can also be used to prepare α-halogenated crotonaldehyde.

Monocyclic aminobenzene compounds that can be employed in the process of our invention include, for example, aniline, o-toluidine, m-toluidine, p-toluidine, o-ethylaniline, m-ethylaniline, p-ethylaniline, m-(n-propyl)-aniline, p-(n-propyl)-aniline, o- and m-(n-butyl)-aniline, o-anisidine, m-anisidine, p-anisidine, o-ethoxyaniline, m-ethoxyaniline, p-ethoxyaniline, m-(n-propoxy)-aniline, m-(n-butoxy)-aniline, o-chloroaniline, m-chloroaniline, p-chloroaniline, o-bromoaniline, m-bromoaniline, p-bromoaniline, o-fluoroaniline, m-fluoroaniline, o-iodoaniline, m-iodoaniline, p-acetaminoaniline, m-acetaminoaniline, m-(n-propionyl)-aminoaniline, m-(n-butyryl)-aminoaniline, p-aminoacetophenone, o-(n-propionyl)-aniline, o-aminophenol, m-aminophenol, p-aminophenol, o-aminobenzoic acid, m-aminobenzoic acid, p-aminobenzoic acid, 1-amino-2-methoxy-5-methylbenzene, 1-amino-2,5-dimethoxy-benzene, m-trifluoromethylaniline, p-trifluoromethylaniline, o-thiomethylaniline, 2-amino-1,4-dimethylbenzene, 4-amino-1,3-dimethylbenzene, 2-amino-4-nitrophenol, 1-amino-4-nitrobenzene, 1-amino-2-chloro-4-nitrobenzene, o-cyanoaniline, p-cyanoaniline, 1-amino-2-cyano-4-nitrobenzene, o-sulfanilic acid, m-sulfanilic acid, p-sulfanilic acid, 1-amino-3-hydroxy-4-methylbenzene, 1-amino-4-hydroxy-3-methylbenzene and 1-amino-5-hydroxy-3-methylbenzene.

The 3-(bromo or chloro)-2-methylquinoline compounds containing a substituent on the benzene nucleus so far as we are aware are new compounds.

The 3-(bromo or chloro)-2-methylquinoline compounds of our invention constitute valuable intermediate compounds which can be used to prepare other compounds. They can, for example, be used to prepare 1,2,3,4-tetrahydroquinoline compounds which are useful as coupling components for the preparation of azo compounds useful as dyes for cellulose acetate. Thus 3-chloro-2-methylquinoline can be fused with sodium hydroxide to obtain 3-hydroxy-2-methylquinoline, reduced with hydrogen in the presence of Raney nickel to obtain 3-hydroxy-2-methyl-1,2,3,4-tetrahydroquinoline and this compound in turn reacted with glyceryl chlorohydrin, for example, to obtain N-β,γ-dihydroxypropyl-3-hydroxy - 2 - methyl - 1,2,3,4 - tetrahydroquinoline which can be coupled with the diazonium form of p-nitroaniline, p-aminoacetophenone, o-chloro-p-nitroaniline, o-cyano-p - nitronaniline and similar aniline compounds to obtain dyes for cellulose acetate. 3-chloro-2-methylquinoline can also be treated with sodium methylate to obtain 3-methoxy-2-methylquinoline which can be treated as 3-hydroxy-2-methylquinoline to obtain N-β,γ-dihydroxypropyl - 3 - methoxy - 2-methyl-1,2,3,4-tetrahydroquinoline. Other 3-chloro-2-methylquinoline or 3-bromo-2-methylquinoline compounds can be used in place of 3-chloro-2-methylquionline. Similarly the nitrogen atom of the resulting tetrahydroquinoline compounds can be substituted with another hydroxyalkyl group such as a β-hydroxyethyl group or a β-hydroxypropyl or an alkyl group such as a methyl group or an ethyl group. The manner of introducing these groups is well known to those skilled in the art to which this invention is directed.

The following examples illustrate the process and the compounds of our invention.

*Example 1*

321 grams of m-toluidine, 480 cc. of hydrochloric acid (sp. gr. 1.18), 540 grams of arsenic acid and 180 cc. of water were heated to refluxing (114° C.) in a 3-necked flask equipped with a reflux condenser, stirrer, and dropping funnel. At this point the heating was discontinued and the addition of 336 grams of α-chloro crotonaldehyde started. The rate of addition was so adjusted that the reaction mixture remained at gentle refluxing conditions. In about 40 to 45 minutes the addition of the α-chloro crotonaldehyde was complete and the reaction mixture was heated at refluxing conditions for 5 to 6 hours longer. Following this the reaction mixture was diluted with several times its volume of water and filtered. The addition of a sodium hydroxide solution to the filtrate in excess of that required to neutralize the acid present precipitated a gummy product which repeatedly extracted with hot benzene. The benzene in the extract was removed by distillation under a reduced pressure of about 20 mm. of mercury and the residue remaining was distilled at a pressure of 1 mm. of mercury. A fraction weighing 143 grams and having a boiling range of 93° C.–115° C. was found to contain 57% of a mixture of 3-chloro-2,7-dimethylquinoline and 3-chloro-2,5-dimethylquinoline. Purification by fractional crystallization from ligroin gave white crystals of 3-chloro-2,7-dimethylquinoline melting at 96–97.5° C. The results of an analysis for nitrogen and chlorine are given herewith:

|  | Found | Theoretical |
| --- | --- | --- |
|  | Per cent |  |
| Nitrogen | 7.19 | 7.31 |
| Chlorine | 18.37 | 18.52 |

By distillation of the residue remaining from the crystallization operation under reduced pressure (5 mm., for example) to remove the ligroin an oily mixture consisting principally of 3-chloro-2,5-dimethylquinoline is obtained. An oil consisting essentially of 3-chloro-2,5-dimethylquinoline is obtained on distilling this oily mixture under reduced pressure.

*Example 2*

A mixture of 93 grams of aniline, 160 cc. of hydrochloric acid (sp. gr. 1.18), 180 grams of arsenic acid and 60 cc. of water were heated together in a suitable reaction vessel to refluxing. 131 grams of α-chloro-β-hydroxybutyraldehyde was warmed (to facilitate addition) and gradually added to the reaction mixture under refluxing conditions, following which the reaction mixture was refluxed with stirring for 6 hours. The reaction mixture was then diluted with several times its volume of water and filtered. Then a sodium hydroxide solution was added to the filtrate in an amount slightly greater than that necessary to neutralize the acid present and the product which precipitated was repeatedly extracted with hot benzene. The benzene in the extract was removed by distillation under a reduced pressure of about 20 mm. of mercury and the residue remaining was distilled at a pressure of 1 mm. of mercury. The fraction distilling at 83–99° C. was found to contain 64% of 3-chloro-2-methylquinoline. Pure 3-chloro-2-methylquinoline was separated from the mixture by fractional crystallization from petroleum ether. It melted at 68–69° C.

*Example 3*

137 grams of 1-amino-2-methoxy-5-methylbenzene, 160 cc. of hydrochloric acid (sp. gr. 1.18), 180 grams of arsenic acid and 60 cc. of water are heated to refluxing in a 3-necked flask equipped with a reflux condenser, stirrer and dropping funnel. The heating is then discontinued and 112 grams of α-chloro crotonaldehyde added at a rate just sufficient to maintain refluxing conditions. After the addition of the α-chloro crotonaldehyde the reaction mixture is heated under refluxing conditions for 5 to 6 hours after which it is diluted with several times its volume of water and filtered. Sodium hydroxide solution is added to the filtrate in excess of that required to neutralize the acid present and the precipitate which forms is repeatedly extracted with hot benzene. The benzene in the extract is removed by distillation under a reduced pressure of about 20 mm. of mercury and the residue remaining is distilled at a pressure of 1 mm. of mercury. 3-chloro - 8 - methoxy-2,5 - dimethylquinoline is obtained. It is obtained as white crystals upon purification by crystallization from ligroin.

150 grams of nitrobenzene or 240 grams of o-nitrobenzene sulfonic acid can be substituted for arsenic acid in the foregoing example. Similarly, 137 grams of $As_2O_5$ can be used in place of arsenic acid. Where $As_2O_5$ is used in place of arsenic acid somewhat more water is employed.

*Example 4*

446 grams of the nitrobenzene sulfonation mixture obtained when 304 grams of nitrobenzene are sulfonated with 1370 grams of 20% oleum, are diluted with 90 grams of water and 107 grams of m-toluidine are added. The mixture is heated to 125° C. and 164 grams of α-bromo crotonaldehyde is added while maintaining the temperature below 130° C. The reaction mixture is then heated for an additional 5–6 hours after which it is worked up in accordance with the procedure described in Example 1. 3-bromo-2,7-dimethylquinoline is obtained as a white, crystalline product. Similarly, as in Example 1, a fraction consisting essentially of 3-bromo-2,5-dimethylquinoline is also obtained.

Following the procedure described hereinbefore the compounds indicated hereinafter can be prepared. For clarity the reactants from which they are prepared are also indicated. The reactions can be carried out, for example, in the presence of hydrochloric acid (sp. g. 1.18) and arsenic acid.

| Product | Reactants |
| --- | --- |
| 3-chloro-2,6-dimethylquinoline | p-toluidine and α-chloro crotonaldehye. |
| 3-bromo-2,6-dimethylquinoline | p-toluidine and α-bromo crotonaldehyde. |
| 3-chloro-8-methoxy-2-methylquinoline | o-anisidine and α-chloro crotonaldehyde. |
| 3-bromo-2-methylquinoline | aniline and α-bromo crotonaldehyde. |
| 3-chloro-8-ethyl-2-methylquinoline | o-ethylaniline and α-chloro crotonaldehyde. |
| 3-chloro-2-methyl-7-n-butylquinoline | m-(n-butyl)-aniline and α-chloro crotonaldehyde. |
| 3-chloro-8-(n-butoxy)-2-methylquinoline | o-(n-butoxy)-aniline and α-chloro crotonaldehyde. |
| 3,6-dichloro-2-methylquinoline | p-chloroaniline and α-chloro crotonaldehyde. |
| 8-bromo-3-chloro-2-methylquinoline | o-bromoaniline and α-chloro crotonaldehyde. |
| 3-chloro-6-fluoro-2-methylquinoline | p-fluoroaniline and α-chloro crotonaldehyde. |
| 3-chloro-7-iodo-2-methylquinoline | m-iodoaniline and α-chloro crotonaldehyde. |
| 6-aceto-3-chloro-2-methylquinoline | p-aminoacetophenone and α-chloro crotonaldehyde. |
| 8-(n-butyryl)-3-bromo-2-methylquinoline | o-(n-butyryl)-aniline and α-bromo crotonaldehyde. |
| 3-bromo-6-hydroxy-2-methylquinoline | p-aminophenol and α-bromo crotonaldehyde. |
| 7-carboxyl-3-chloro-2-methylquinoline | m-aminobenzoic acid and α-chloro crotonaldehyde. |
| 3-bromo-8-methoxy-2,5-dimethylquinoline | 1-amino-2-methoxy-5-methyl benzene and α-bromo crotonaldehyde. |
| 3-chloro-2-methyl-8-trifluoromethylquinoline | o-trifluoromethylaniline and α-chloro crotonaldehyde. |
| 3-chloro-2-methyl-8-thiomethylquinoline | o-thiomethylaniline and α-chloro crotonaldehyde. |
| 3-chloro-2-methyl-7-nitroquinoline | m-nitroaniline and α-chloro crotonaldehyde. |
| 3-bromo-2-methyl-8-nitroquinoline | o-nitroaniline and α-bromo crotonaldehyde. |
| 3-chloro-8-hydroxy-2-methyl-5-nitroquinoline | 2-amino-4-nitrophenol and α-chloro crotonaldehyde. |
| 3-chloro-8-cyano-2-methylquinoline | o-cyanoaniline and α-chloro crotonaldehyde. |
| 3-bromo-2,5,8-trimethylquinoline | 2-amino-1,4-dimethylbenzene and α-bromo crotonaldehyde. |
| 3-chloro-2-methyl-8-sulfoquinoline | o-sulfanilic acid and α-chloro crotonaldehyde. |
| 3-chloro-2-methyl-7-sulfoquinoline | m-sulfanilic acid and α-chloro crotonaldehyde. |
| 3-bromo-2-methyl-6-sulfoquinoline | p-sulfanilic acid and α-bromo crotonaldehyde. |
| 7-acetamino-3-chloro-2-methylquinoline | p-(n-butyryl)-aminoaniline and α-bromo crotonaldehyde. |
| 6-(n-butyryl)-amino-3-bromo-2-methylquinoline | m-acetaminoaniline and α-chloro crotonaldehyde. |

While the process of our invention has been illustrated more particularly in connection with the use of hydrochloric acid as the mineral acid, it is to be noted that other mineral acids such as hydrobromic acid, hydrofluoric acid, ortho phosphoric acid and sulfuric acid, for example, can be used. Similarly, an oxidizing agent, such as nitrobenzene and o-nitrobenzene sulfonic acid, for example, can be used instead of arsenic acid or its anhydride As₂O₅. The α-chloro crotonaldehyde and α-bromo crotonaldehyde referred to in the foregoing tabulation can, of course, be replaced by α-chloro-β-hydroxy-n-butyraldehyde and α-bromo-β-hydroxy-n-butyraldehyde, respectively.

We claim:

1. A process for preparing a compound selected from the group consisting of 3-chloro-2-methylquinoline compounds and 3-bromo-2-methylquinoline compounds which comprises reacting a compound selected from the group consisting of aniline, o-toluidine, m-toluidine, p-toluidine, o-anisidine, m-anisidine, p-anisidine, o-nitroaniline, m-nitroaniline, p-nitroaniline, 2-methoxy-5-methylaniline and a mono halogen aniline compound containing no substituents other than the amino group and the halogen atom with a compound selected from the group consisting of α-chloro crotonaldehyde α-chloro-β-hydroxy-n-butyraldehyde, α-bromo-β-hydroxy-n-butyraldehyde and α-bromo crotonaldehyde in the presence of a mineral acid and an oxidizing agent.

2. A process for preparing a 3-chloro-2-methylquinoline compound which comprises reacting a compound selected from the group consisting of aniline, o-toluidine, m-toluidine, p-toluidine, o-anisidine, m-anisidine, p-anisidine, o-nitroaniline, m-nitroaniline, p-nitroaniline, 2-methoxy-5-methylaniline and a mono halogen aniline compound containing no substituents other than the amino group and the halogen atom with a member selected from the group consisting of α-chloro-β-hydroxy-n-butyraldehyde and α-chloro crotonaldehyde in the presence of hydrochloric acid and an oxidizing agent.

3. A process for preparing a 3-chloro-2-methylquinoline compound which comprises reacting a compound selected from the group consisting of aniline, o-toluidine, m-toluidine, p-toluidine, o-anisidine, m-anisidine, p-anisidine, o-nitroaniline, m-nitroaniline, p-nitroaniline, 2-methoxy-5-methylaniline and a mono halogen aniline compound containing no substituents other than the amino group and the halogen atom with a member selected from the group consisting of α-chloro-β-hydroxy-n-butyraldehyde and α-chloro crotonaldehyde in the presence of hydrochloric acid and arsenic acid.

4. A process for preparing a 3-bromo-2-methylquinoline compound which comprises reacting a compound selected from the group consisting of aniline, o-toluidine, m-toluidine, p-toluidine, o-anisidine, m-anisidine, p-anisidine, o-nitroaniline, m-nitroaniline, p-nitroaniline, 2-methoxy-5-methylaniline and a mono halogen aniline compound containing no substituents other than the amino group and the halogen atom with a member selected from the group consisting of α-bromo-β-hydroxy-n-butyraldehyde and α-bromo crotonaldehyde in the presence of hydrochloric acid and an oxidizing agent.

5. A process for preparing a 3-bromo-2-methylquinoline compound which comprises reacting a compound selected from the group consisting of aniline, o-toluidine, m-toluidine, p-toluidine, o-anisidine, m-anisidine, p-anisidine, o-nitroaniline, m-nitroaniline, p-nitroaniline, 2-methoxy-5-methylaniline and a mono halogen aniline compound containing no substituents other than the amino group and the halogen atom with a member selected from the group consisting of α-bromo-β-hydroxy-n-butyraldehyde and α-bromo crotonaldehyde in the presence of hydrochloric acid and arsenic acid.

6. A process for preparing 3-chloro-2-methylquinoline which comprises reacting aniline with a member selected from the group consisting of α-chloro-β-hydroxy-n-butyraldehyde and α-chloro crotonaldehyde in the presence of a mineral acid and an oxidizing agent.

7. A process for preparing 3-chloro-2-methyl-quinoline which comprises reacting aniline with a member selected from the group consisting of α-chloro-β-hydroxy-n-butyraldehyde and α-chloro crotonaldehyde in the presence of hydrochloric acid and arsenic acid.

JOSEPH B. DICKEY.
FRED C. DUENNEBIER.

REFERENCES CITED

The following references are of record in the file of this patent:

UNITED STATES PATENTS

| Number | Name | Date |
|---|---|---|
| 1,752,492 | Kyrides | Apr. 1, 1930 |
| 1,806,564 | Prill et al. | May 19, 1931 |
| 2,035,751 | Kunz et al. | Mar. 31, 1936 |

FOREIGN PATENTS

| Number | Country | Date |
|---|---|---|
| 559,329 | Germany | Feb. 20, 1933 |
| 388,087 | Great Britain | Feb. 23, 1933 |

OTHER REFERENCES

Busch et al.: Berichte, vol. 24, pp. 3692–3694 (1891).

Hollins: "The Synthesis of Nitrogen Ring Compounds" (Van Nostrand, New York, 1924), p. 266.

Braun et al.: Berichte, 63–B, p. 3194 (1930).

Braun: Berichte, 70–B, p. 981 (1937).

Utermohlen: J. Org. Chem., vol. 8, pp. 544–548 (1943).

Fieser et al.: "Organic Chemistry" (D. C. Health, Boston, 1944), pp. 214 and 215.

Certificate of Correction

May 9, 1950

Patent No. 2,507,146    JOSEPH B. DICKEY ET AL.

It is hereby certified that errors appear in the printed specification of the above numbered patent requiring correction as follows:

Column 3, line 20, for "methylquionline" read *methylquinoline*; line 51, after the word "which" insert *was*; columns 5 and 6, in the tabulation, second column thereof, last two lines, for "p-(n-butyryl)-aminoaniline and α-bromo crotonaldehyde.
m-acetaminoaniline and α-chloro crotonaldehyde."

read

*m-acetaminoaniline and α-chloro crotonaldehyde.*
*p-(n-butyryl)-aminoaniline and α-bromo crotonaldehyde.* and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*